UNITED STATES PATENT OFFICE.

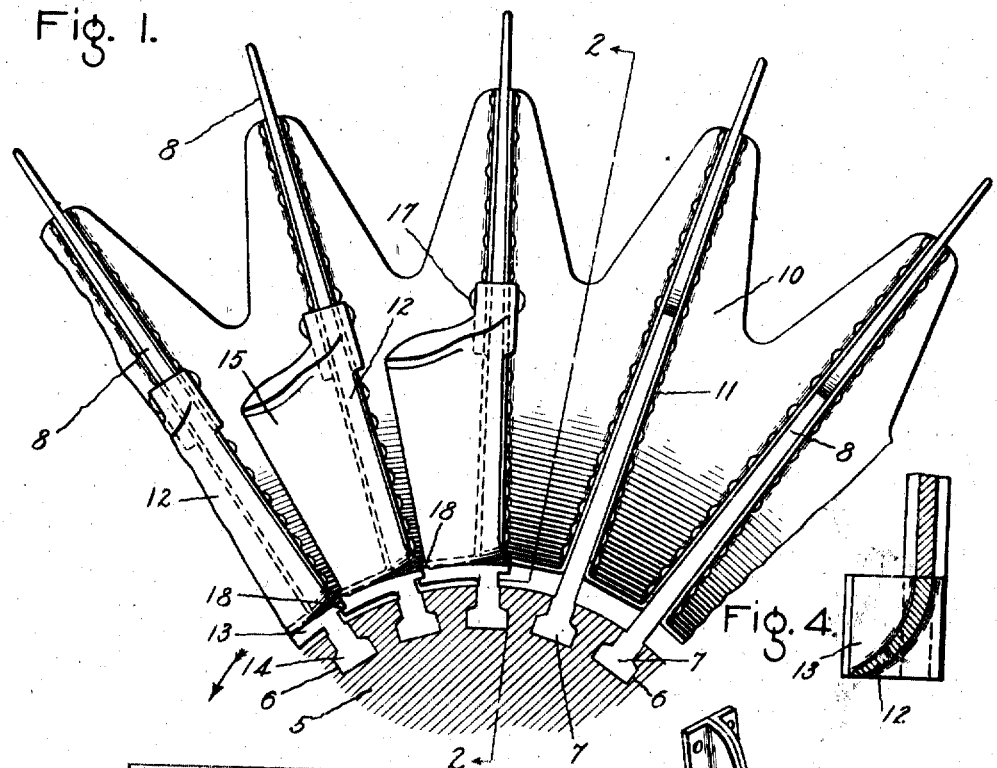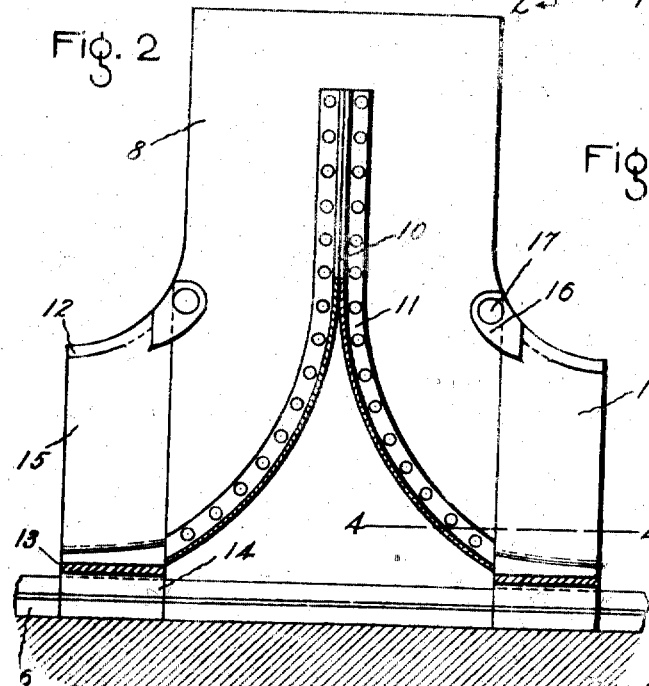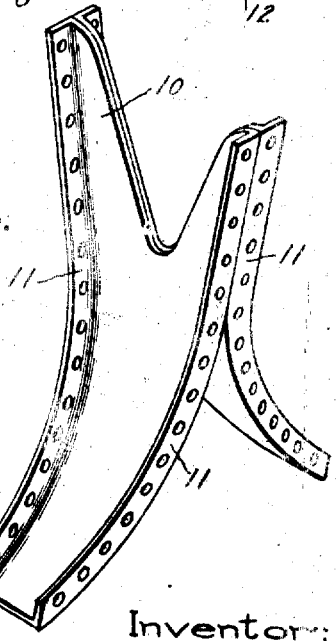

EDMUND M. PHILLIPS, OF LYNN, MASSACHUSETTS, ASSIGNOR TO GENERAL ELECTRIC COMPANY, A CORPORATION OF NEW YORK.

CENTRIFUGAL COMPRESSOR.

1,250,005.  Specification of Letters Patent.  Patented Dec. 11, 1917.

Application filed December 23, 1916. Serial No. 138,587.

*To all whom it may concern:*

Be it known that I, EDMUND M. PHILLIPS, a citizen of the United States, residing at Lynn, county of Essex, State of Massachusetts, have invented certain new and useful Improvements in Centrifugal Compressors, of which the following is a specification.

The present invention relates to centrifugal compressors and has for its object to provide an improved impeller for such machines.

For a consideration of what I believe to be novel and my invention, attention is directed to the accompanying description and the claims appended thereto.

In the accompanying drawing, Figure 1 is a side elevation of a portion of an impeller embodying my invention, the entrance buckets of some of the blades being omitted to better illustrate the structure; Fig. 2 is a section taken on line 2—2, Fig. 1; Fig. 3 is a perspective view of a guiding and bracing member, and Fig. 4 is a section taken on line 4—4, Fig. 2.

Referring to the drawing, 5 indicates a blade-carrying member as a shaft having T-slots or dovetailed slots 6 machined in it into which are fastened the T-shaped bases 7 of a series of radial blades 8. This is a very simple fastening means for the blades and at the same time a strong one which can withstand the centrifugal stresses. Between the blades are fastened guiding and bracing members comprising curved plates 10 preferably formed of sheet steel and provided with flanges 11 which are riveted to the radial blades 8. In the present instance a double-sided impeller is shown, that is, one designed to take in fluid on the two sides and deliver it around the periphery, and two curved plates 10 placed back to back as shown in Fig. 3 so that they curve in opposite directions, are accordingly riveted between each two blades 8. The curved plates 10 act as guides for the fluid being pumped serving to direct it smoothly and evenly toward the periphery of the impeller, thereby giving the impeller a good efficiency. At the same time they bind all the individual blades together in a complete ring so as to guard against and prevent vibration of the blades. They also serve to give great stiffness to the impeller. 12 indicates the entrance buckets for the blades 8. In Fig. 1 of the drawing the entrance buckets 12 are omitted from the two right-hand blades for purposes of illustration, but it will be understood that all the blades are provided with entrance buckets. The entrance buckets 12 each comprises a base plate 13, on one side of which is a T-shaped projection 14 which fits into the end of slot 6. By this arrangement the same slots serve to hold both the radial blades and the entrance buckets. On the other side of base plate 13 is a wing 15 which curves forward in the direction of rotation and which catches the fluid being pumped and directs it to the impeller. The peripheral portion of wing 15 is fastened to the adjacent blade by a pair of spaced lugs 16 which project therefrom, one on each side of the blade and through which a rivet 17 passes.

The centrifugal force acting on the entrance buckets when the impeller is rotating is considerable and it is accordingly necessary that they be firmly held. To insure this, the bases 13 are arranged to overlap one with another, as indicated at 18. This ties the entrance buckets together, and serves to secure the outer face edges of the wings. The direction of rotation is that indicated by the arrow, and it will be noted that the bases 13 overlap in such a manner that the edge of the base adjacent the outer edge of the wing laps under the next adjoining base. This serves to distribute the centrifugal force and renders the buckets mutually supporting.

The above described impeller is comparatively simple in structure, light in weight, and cheap to build. At the same time, owing to the arrangement of the parts, a very strong substantial structure is obtained.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a centrifugal compressor, the combination of a blade-carrying member having slots therein, radial blades having their bases fixed in said slots, said blades being of less width than said slots, and entrance buckets having projecting portions which fit into the ends of said slots and are held therein.

2. In a centrifugal compressor, the combination of a blade-carrying member having slots therein, radial blades having their bases fixed in said slots, said blades being of less width than said slots, and entrance buckets having projecting portions which fit into the ends of said slots and are held therein against the edges of said blades, said buckets having base plates which overlap so as to mutually support the buckets.

3. In a centrifugal compressor, the combination of a blade-carrying member having dovetailed slots therein, radial blades having dovetailed bases fixed in said slots, said blades being of less width than said slots, curved entrance buckets having ears fixed to the sides of said radial blades, dovetailed projections on said buckets which fit into the ends of said slots, and base plates on which the lower portions of said buckets are supported, said base plates having overlapping projections interlocking such base plates together.

4. In a centrifugal compressor, the combination of a blade-carrying member having dovetailed slots therein, radial blades having dovetailed bases fixed in said slots, a pair of oppositely curved members fixed between each two blades and fastened thereto, and entrance buckets having projections which also fit into said slots and are fastened to the blades.

5. In a centrifugal compressor, the combination of a blade-carrying member having dovetailed slots therein, radial blades having dovetailed bases fixed in said slots, a pair of oppositely curved members fixed between each two blades and fastened thereto, and entrance buckets fastened to the blades and having projections which also fit into said slots, said buckets having base plates which overlap so as to mutually support the buckets.

In witness whereof, I have hereunto set my hand this twentieth day of December, 1916.

EDMUND M. PHILLIPS.